United States Patent
Muszynski

(10) Patent No.: US 6,196,616 B1
(45) Date of Patent: Mar. 6, 2001

(54) VEHICLE TOP ACCESSORY

(76) Inventor: Ralph J. Muszynski, 8802 Foresthills Blvd., Dallas, TX (US) 75218

( * ) Notice: Subject to any disclaimer, the term of this patent is extended or adjusted under 35 U.S.C. 154(b) by 0 days.

(21) Appl. No.: 09/170,408

(22) Filed: Oct. 13, 1998

(51) Int. Cl.[7] .................................................. B60J 7/08
(52) U.S. Cl. .............................. 296/107.13; 296/107.19; 296/216.05
(58) Field of Search .................... 296/216.01, 100.17, 296/107.13, 107.19, 216.05

(56) References Cited

U.S. PATENT DOCUMENTS

| Re. 33,790 | 1/1992 | Huber . | |
|---|---|---|---|
| D. 384,324 | 9/1997 | Barker . | |
| 2,289,173 | * 7/1942 | Best | 296/107.19 |
| 3,964,783 | 6/1976 | Fisher . | |
| 4,883,313 | * 11/1989 | Bradley | 296/216.05 |
| 4,898,420 | * 2/1990 | Takada | 296/219 |
| 5,009,465 | 4/1991 | Induni . | |
| 5,299,850 | * 4/1994 | Kaneko et al. | 296/107.13 |
| 5,310,241 | 5/1994 | Omoto et al. . | |
| 5,620,266 | 4/1997 | Kim . | |
| 5,658,037 | 8/1997 | Evans et al. . | |

* cited by examiner

*Primary Examiner*—D. Glenn Dayoan
(74) *Attorney, Agent, or Firm*—Kristofer E. Elbing

(57) ABSTRACT

A top accessory to be mounted on an open-topped vehicle includes a front mounting mechanism and a rear mounting mechanism. A forward-running guide is located generally in a plane between the front and rear mounting mechanisms in the accessory's mounted position and is resistant to forces having a component normal to the plane. A flexible top interacts with the rear mounting mechanism, the front mounting mechanism, and the guide. Embodiments of the accessory can be constructed in such a way as to allow an occupant of the vehicle to deploy its top without leaving his or her seat.

22 Claims, 2 Drawing Sheets

VEHICLE TOP ACCESSORY

FIELD OF THE INVENTION

This invention relates to top accessories to be fitted on open-topped vehicles, such as off-road vehicles.

BACKGROUND OF THE INVENTION

Off-road vehicles may be equipped with a convertible top or a removable hard top. In some climates, however, a top may be very rarely needed. In these areas, some users employ simple fabric tops that include buckles and straps. When precipitation threatens, these tops can be buckled in place to cover the vehicle.

SUMMARY OF THE INVENTION

One general aspect of the invention features a top accessory to be mounted on an open-topped vehicle. The accessory includes a front mounting mechanism and a rear mounting mechanism. A forward-running guide is located generally in a plane between the front and rear mounting mechanisms in the accessory's mounted position and is resistant to forces having a component normal to the plane. A flexible top interacts with the rear mounting mechanism, the front mounting mechanism, and the guide.

In the preferred embodiments, the guide can include at least one track shaped to interact with runners attached to the flexible top. The flexible top can include rigid sections. The front mounting mechanism can include holes that match the position of sun visor holes in a vehicle and tapped generally cylindrical fasteners sized to pass through the holes. A first latching mechanism portion can be attached to an edge of the flexible top and be constructed and adapted to interact with a second latching portion when the top accessory is in a closed position. The rear mounting mechanism can include straps. A handle can be attached to a front portion of the flexible top.

Another general aspect of the invention features a top accessory to be mounted on an open-topped vehicle and includes means for mounting the top accessory to the open-topped vehicle, means for covering the vehicle, and means for guiding the means for covering between a closed position and an open position. In the preferred embodiments, the means for guiding can include a rigid element adapted to span from an upper, rear portion of a passenger compartment to an upper, front portion of the passenger compartment. The means for mounting can include means constructed and adapted to be attached to a roll bar and to an upper edge of a windshield, with the means for guiding being located between the means for mounting. The means for covering can be a cloth top. The accessory can include means for latching the accessory when the means for covering is deployed. The accessory can include a grasping means for allowing a driver to deploy the means for covering without leaving his or her seat in the vehicle.

Yet another general aspect of the invention features a method of operating an off-road vehicle that includes installing a top accessory on the vehicle and driving the vehicle with the top accessory in an open position. The method also includes closing top accessory by at least one occupant of the vehicle while the at least one occupant of the vehicle remains substantially seated. In the preferred embodiments, the step of closing can be performed while the vehicle is moving. The method can also include the step of driving the vehicle before the step of installing. The method can further include steps of removing and replacing the top accessory, and the step of installing can be performed by a regular occupant of the vehicle.

Still yet another general aspect of the invention features a method of operating an off-road vehicle that includes installing a top accessory on a vehicle, the top accessory including a flexible top, driving the vehicle with the top accessory in an open position, drawing the flexible top into a closed position, and using a guide to guide the flexible top during the step of guiding.

Top accessories according to the invention may be advantageous in that a driver of an off-road vehicle can rapidly and conveniently deploy them. Embodiments of the invention can also be constructed in such a way as to allow an occupant of the vehicle to deploy its top without leaving his or her seat, making this deployment rapid, convenient, and safe. Top accessories according to the invention may even be designed so that the top may be closed without stopping the vehicle, further reducing exposure to the elements and enhancing convenience and safety. These benefits may be particularly valuable in areas where sudden and violent precipitation is common (e.g., cloud bursts, dust storms). And these benefits can be made available in a relatively inexpensive and unobtrusive after-market accessory that can be easily installed by the driver.

DETAILED DESCRIPTION OF AN ILLUSTRATIVE EMBODIMENT

Figure 1:
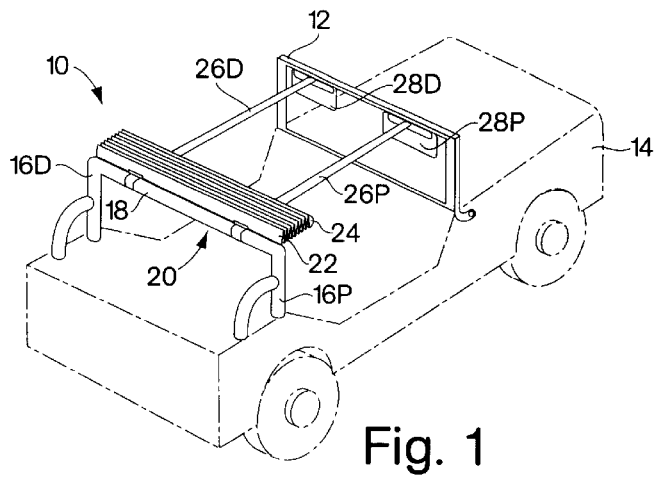
FIG. 1 is a perspective view of an off-road vehicle body equipped with an accessory according to the invention.
Figure 2:
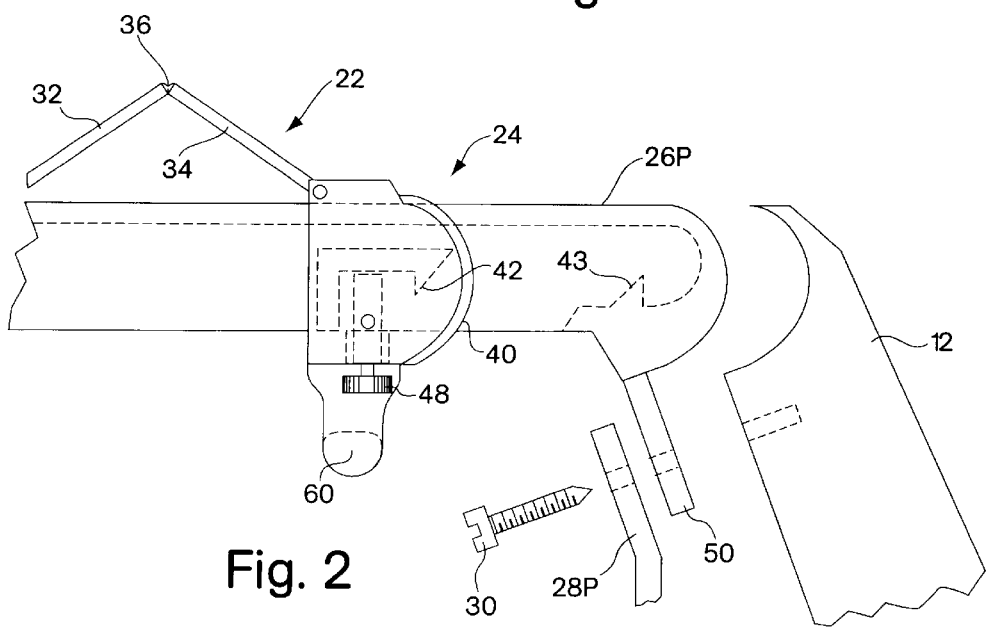
FIG. 2 is a detailed side view of the front of the accessory of FIG. 1 shown partially closed and before installation.

Referring to FIGS. 1 and 2, a vehicle 10 includes a windshield frame 12 mounted on a body 14 which also supports a roll-bar. The roll-bar includes a driver-side upright section 16D, a passenger-side upright section 16P, and a horizontal section 18 connected between top ends of the two upright sections. A top accessory 20 can be mounted between the roll-bar and the windshield frame.

The top accessory 20 includes a flexible cover 22, a front gasket assembly 24, a driver-side track 26D, and a passenger-side track 26P. A rear edge of the cover can be mounted to the horizontal section 18 of the roll-bar. The flexible cover can be an injection-molded fan-fold cover made up of cover sections 32, 34 separated by one or more living hinges 36. Other types of cover can also be used, such as canvas, vinyl, or hinged metal sections.

The rear of the driver-side track 26D can be connected to a location on the driver's side of the horizontal section 18 of the roll-bar, and the front of the driver-side track can be connected to the top edge of the windshield frame 12 via the mounting holes for the vehicle's driver-side sun visor 28D.

Similarly, the rear of the passenger side track 26P can be connected to a location on the horizontal section of the roll-bar on the passenger's side, and the front of the passenger-side track can be connected to the passenger side top edge of the windshield frame via mounting holes for the passenger-side sun visor 28P.

Figure 3:
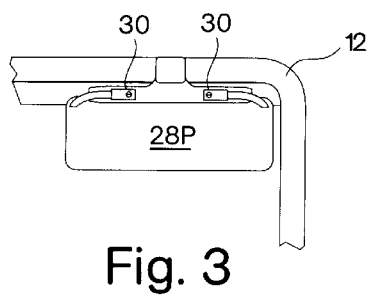
FIG. 3 is a forward-facing view of one of the front mounts of the accessory of FIG. 1 shown installed on the vehicle.
Figure 4:
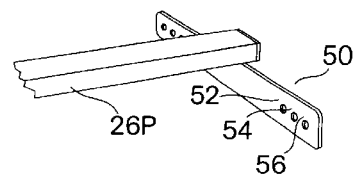
FIG. 4 is a perspective view of the mount of FIG. 3 shown outside of the vehicle.

Referring to FIGS. 2–4, the front of the passenger-side track 26P is shaped to interact with a surface of the top edge of the windshield frame 12. The track can be attached to a plate 50 with holes that correspond to the mounting holes of the passenger-side sun visor 28P. This allows the plate to be sandwiched between the sun visor and the top edge of the windscreen and held in place with a screw 30, which can be longer than the screw originally used to hold the sun visor in place. The plate 50 can be provided with a number of holes 52, 54, 56 so that it can be mounted on different types of vehicles. The fronts of the tracks can also be attached to the top edge of the windshield frame with screws that mate with holes that are newly drilled for that purpose, or by interacting with other pre-existing features of the windshield frame, such as convertible top latch parts.

Figure 5:
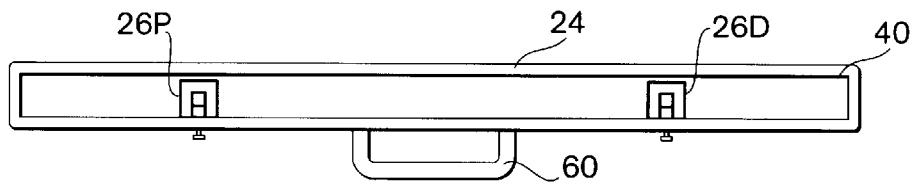
FIG. 5 is a rearward facing view of the front of the accessory of FIG. 1.

Referring to FIGS. 2 and 5, the front gasket assembly 24 includes a front gasket 40, a latch 42, and a handle 60. The latch 42 is positioned to interact with a corresponding stop 43 in the passenger-side track 26P in a position that slightly compresses the gasket 40. A second latch can also be provided to interact with a second corresponding stop in the driver-side track 26D. Other latching arrangements could also be employed, including the single latches, clamps, bolts, or other suitable mechanisms.

Figure 6:
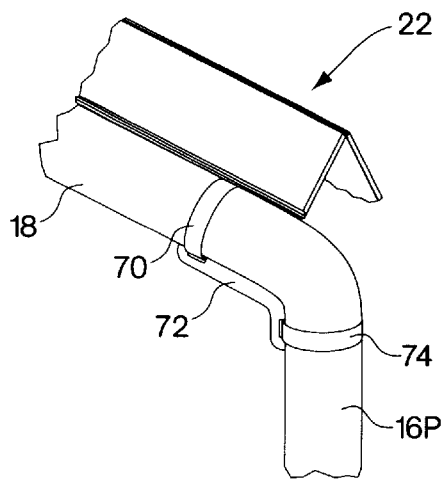
FIG. 6 is a perspective view of the rear mount of the accessory of FIG. 1 mounted on a roll-bar of the vehicle body of FIG. 1.

Referring to FIG. 6, a rear edge of the cover 22 is connected to the rear of the tracks 26D, 26P and to a first passenger-side strap 70. The strap can be equipped with hook-and-loop fastener to hold it tightly in place around the horizontal section 18 of the roll-bar. A corner bracket 72 includes a first opening through which the first strap 70 passes. A second strap 74 passes through a second opening in the bracket and surrounds the passenger-side upright 16P of the roll-bar. A similar arrangement can be provided on the driver's side.

Figure 7:
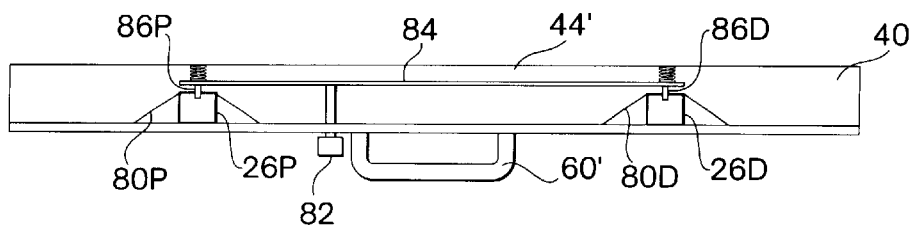
FIG. 7 is a rearward facing view of the front of an alternative embodiment of the accessory of FIG. 1.

Referring to FIG. 7, an alternative embodiment of the top accessory of FIG. 1 employs two horizontally-mounted front-to-rear running tracks 26D', 26P' that run through channels 80D, 80P in an alternative gasket assembly 44'. A release button 82 sits adjacent a handle 60', and is positioned to interact with a spring-loaded locking arm 84. Two downward-facing locking pins 86D, 86P are mounted on the locking arm and interact with holes toward the front of the tracks. These pins snap into the holes in the track when the top accessory is closed and hold the top closed until they are retracted by user actuation of the release button.

To install the accessory 10, the installer positions it roughly in its position on top of the vehicle and loosely secures the straps around the roll-bar. The user then removes the screws from the visor mounts and replaces the sun visors with the plate 50 between them and the mounting holes. The user completes the installation by tightening the straps. This operation can easily be performed by most vehicle owners or users.

In operation, the driver or passenger of the vehicle can grasp the handle 60 on the top accessory 20 and draw the gasket assembly along the tracks 26B, 26P until the latch 42 engages the stop 43 (or the pins 86D, 86P snap into the holes), at which point the cover 22 will be deployed over them. The driver or passenger can perform this operation without leaving their seats. This can reduce the amount of precipitation that is permitted to enter the vehicle and prevent any of the occupants having to stand outside the vehicle, which can be dangerous in some situations. If the accessory is engineered, constructed, and installed appropriately, the top can be closed without even stopping the vehicle in at least some circumstances, further reducing exposure to precipitation and enhancing safety and convenience. To remove the top, an occupant of the vehicle presses a release button 48 which lifts the latch 42 from the stop 43 (or extracts the pins 86D, 86P from the holes) and allows the gasket assembly 24 (or 24') to be drawn to the back of the vehicle.

In the embodiment described above, straps and sun visor mounts are used to hold rigid guides between a roll-bar and a windshield, but other mounting mechanisms, guide configurations, and mounting locations may also be employed. It may be possible, for example, to use cables in the place of tracks. It can also be feasible to use clamps, hook-and-loop fasteners, or simple interlocking profiles to connect the guides to the roll bar and/or upper edge of the windshield, or even to attach the guides to other parts of the vehicle, such as parts of the vehicle's hood or parts of the rear-most section of the vehicle's body. It may further be possible to provide a rigid guide that is regularly attached at one end only and is fastened to the other end only when closed, but which still allows the roof to be opened or closed without stopping the vehicle. The combination of elongated moveable guides that pass through sturdily mounted cylindrical holes located on an attachment to the roll-bar is one mechanism that could accomplish this objective. Such an embodiment could include a mounting mechanism that interacts with the windshield only when the top is closed.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A top accessory to be mounted on an open-topped vehicle having a roll bar behind a passenger compartment and a windshield in front of the passenger compartment, comprising:

a front mounting mechanism constructed and adapted to be located at the windshield in at least the accessory's mounted and closed position, a rear mounting mechanism constructed and adapted to be located at the roll bar in at least the accessory's mounted and closed position, a forward-running guide located generally in a plane between the front and rear mounting mechanisms and over the passenger compartment in at least the top accessory's mounted and closed position and being resistant to forces having a component normal to the plane, and a flexible top that interacts with the rear mounting mechanism, the front mounting mechanism, and the forward-running guide.

2. The top accessory of claim 1 wherein the guide includes at least one track shaped to interact with runners attached to the flexible top.

3. The top accessory of claim 1 wherein the guide includes a pair of tracks shaped to interact with runners attached to the flexible top.

4. The top accessory of claim 1 wherein the flexible top includes rigid sections.

5. The top accessory of claim 1 wherein the front mounting mechanism includes holes that match a position of sun visor holes in a vehicle and includes tapped generally cylindrical fasteners sized to pass through the holes.

6. The top accessory of claim 1 further including a first latching mechanism portion attached to an edge of the flexible top and being constructed and adapted to interact with a second latching portion when the top accessory is in a closed position.

7. The top accessory of claim 1 wherein the rear mounting mechanism includes straps.

8. The top accessory of claim 1 further including a handle attached to a front portion of the flexible top.

9. A top accessory to be mounted on an open-topped vehicle having a roll bar behind a passenger compartment and a windshield in front of the passenger compartment, comprising:

means for mounting the top accessory to the open-topped vehicle between the windshield and the roll bar, the means for mounting including front mounting means for mounting at the windshield in at least the accessory's mounted and closed position, and rear mounting means for mounting at the roll bar in at least the accessory's mounted and closed position, means for covering the vehicle, and forward-running means for guiding the means for covering over the passenger compartment between a closed position and an open position, wherein the means for guiding is located generally in a plane between the front and rear mounting mechanisms in at least the top accessory's mounted and closed position and being resistant to forces having a component normal to the plane, wherein the means for covering interacts with the rear mounting means, the front mounting means, and the forward-running means for guiding.

10. The top accessory of claim 9 wherein the means for guiding includes a rigid element adapted to span from an upper, rear portion of a passenger compartment to an upper, front portion of the passenger compartment.

11. The top accessory of claim 9 wherein the means for mounting includes means constructed and adapted to be attached to a roll bar and to an upper edge of a windshield, and wherein the means for guiding is located between the means for mounting.

12. The top accessory of claim 9 wherein the means for covering is a cloth top.

13. A top accessory to be mounted on an open-topped vehicle having a roll bar behind a passenger compartment and a windshield in front of the passenger compartment, comprising:

means for mounting the top accessory to the open-topped vehicle between the windshield and the roll bar, wherein the means for mounting includes holes that are constructed and adapted to match a position of sun visor holes in the vehicle and includes tapped generally cylindrical fasteners sized to pass through the holes, means for covering the vehicle, and means for guiding the means for covering over the passenger compartment between a closed position and an open position.

14. The top accessory of claim 9 further including means for latching the accessory when the means for covering is deployed.

15. The top accessory of claim 9 further including a grasping means for allowing a driver to deploy the means for covering without leaving his or her seat in the vehicle.

16. A method of operating an off-road vehicle having a roll bar behind a passenger compartment and a windshield in front of the passenger compartment, comprising:

installing a top accessory on the vehicle between the windshield and the roll bar, wherein the step of installing installs a front mounting mechanism located at the windshield in at least the accessory's mounted and closed position, a rear mounting mechanism located at the roll bar in at least the accessory's mounted and closed position, and a forward-running guide generally in a plane between the front and rear mounting mechanisms and over the passenger compartment in at least the top accessory's mounted and closed position and being resistant to forces having a component normal to the plane, and a flexible top that interacts with the rear mounting mechanism, the front mounting mechanism, and the forward-running guide, driving the vehicle with the top accessory in an open position, and closing the top accessory above the passenger compartment by at least one occupant of the vehicle while at least one occupant of the vehicle remains substantially seated.

17. The method of claim 16 wherein the step of closing is performed while the vehicle is moving.

18. The method of claim 16 further including the step of driving the vehicle before the step of installing.

19. The method of claim 16 further including steps of removing and replacing the top accessory.

20. The method of claim 16 wherein the step of installing is performed by an individual who regularly occupies the vehicle.

21. A method of operating an off-road vehicle having a roll bar behind a passenger compartment and a windshield in front of the passenger compartment, comprising:

installing a top accessory on a vehicle between the windshield and the roll bar, the top accessory including a flexible top, wherein the step of installing installs a front mounting mechanism located at the windshield in at least the accessory's mounted and closed position, a rear mounting mechanism located at the roll bar in at least the accessory's mounted and closed position, and a forward-running guide generally in a plane between the front and rear mounting mechanisms and over the passenger compartment in at least the top accessory's mounted and closed position and being resistant to forces having a component normal to the plane, and a flexible top that interacts with the rear mounting mechanism, the front mounting mechanism, and the forward-running guide, driving the vehicle with the top accessory in an open position, drawing the flexible top into a closed position, and using a guide to guide the flexible top above the passenger compartment generally in a plane between the roll bar and the windshield during the step of drawing.

22. The top accessory of claim 1 wherein the front mounting mechanism includes a plate separate from the windshield and attached to a top edge of the windshield and wherein the rear mounting mechanism includes a pair of straps separate from the roll bar and each attached to a horizontal portion of the roll bar.

* * * * *